(12) United States Patent
Pratt et al.

(10) Patent No.: US 7,049,015 B2
(45) Date of Patent: May 23, 2006

(54) METHOD OF OPERATING A FUEL CELL POWER SOURCE

(75) Inventors: Steven Duane Pratt, Ft. Lauderdale, FL (US); Sivakumar Muthuswamy, Plantation, FL (US); Ronald James Kelley, Coral Springs, FL (US); Robert W. Pennisi, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 436 days.

(21) Appl. No.: 10/121,362

(22) Filed: Apr. 12, 2002

(65) Prior Publication Data

US 2003/0194589 A1    Oct. 16, 2003

(51) Int. Cl.
*H01M 8/04* (2006.01)

(52) U.S. Cl. ............................ 429/13; 429/22; 700/291

(58) Field of Classification Search ................. 429/22, 429/13; 700/286, 291, 295
See application file for complete search history.

(56) References Cited

U.S. PATENT DOCUMENTS

| 5,023,150 A | 6/1991 | Takabayashi |
| 5,290,641 A | 3/1994 | Harashima |
| 5,808,448 A | 9/1998 | Naito |
| 5,847,566 A * | 12/1998 | Marritt et al. ............... 324/427 |
| 5,945,229 A * | 8/1999 | Meltser ........................ 429/13 |
| 5,991,670 A * | 11/1999 | Mufford et al. ................ 701/22 |
| 6,300,000 B1 | 10/2001 | Cavalca et al. |
| 6,321,145 B1 | 11/2001 | Rajashekara |
| 6,522,955 B1 * | 2/2003 | Colborn ....................... 700/286 |
| 6,581,015 B1 * | 6/2003 | Jones et al. ................... 702/60 |
| 6,672,415 B1 * | 1/2004 | Tabata ........................ 180/65.2 |
| 2002/0192516 A1* | 12/2002 | Tajima ........................ 429/22 |

FOREIGN PATENT DOCUMENTS

EP          907296 A1 *  4/1999

* cited by examiner

*Primary Examiner*—Gregg Cantelmo
(74) *Attorney, Agent, or Firm*—Randi L. Karpinia

(57) ABSTRACT

A fuel cell power source (100) for use in electronic systems includes a fuel cell system (130) and a controller (150). The controller (150) computes net power requirements of a load device from one or more power functional information sources; and determines an operating point of the fuel cell system (130) by matching the net power requirements with the power characteristics of the fuel cell system (130).

12 Claims, 3 Drawing Sheets

METHOD OF OPERATING A FUEL CELL POWER SOURCE

BACKGROUND OF THE INVENTION

1. Field of the Invention

This invention relates in general to fuel cell powers sources, and more particularly to a method and a system for operating a fuel cell power source.

2. Description of the Related Art

In recent years, as portability has increased in popularity, designers of electronic devices continue to reduce the device's size and weight. These reductions have been made possible, in part, by the development of new battery chemistries such as nickel-metal hydride, lithium ion, zinc-air, and lithium polymer, which enable larger amounts of power to be packaged into a smaller container. Secondary or rechargeable batteries need to be recharged upon depletion of their electrical capacity. Recharging is typically performed by connecting the battery to a battery charger that converts alternating current to a low level direct current of 2 to 12 volts. The charging cycle lasts a minimum of 1 to 2 hours, and more commonly lasts for 4 to 14 hours. One drawback of the current battery technology is the need for sophisticated charging regimens and the slow charging rates.

Fuel cells are expected to be the next major source of energy for portable electronic products. Fuel cells catalytically convert hydrogen molecules into hydrogen ions and electrons, and then extract the electrons through a membrane as electrical power, while oxidizing the hydrogen ions to $H_2O$ and extracting the byproduct water. One advantage of fuel cells is the ability to provide significantly larger amounts of power in a small package, as compared to a conventional battery. Their potential ability to provide long talk-times and standby times in portable communication device applications are motivating the continued miniaturization of fuel cell technologies. For example, the Polymer Electrolyte Membrane (PEM) based air-breathing, dead-ended fuel cells are ideally suited for powering portable communication devices and other portable electronic devices.

In the case of a conventional battery powered electronic device, the operational characteristics and usage pattern of the electronic device do not significantly impact the efficiency, the reliability or the lifetime of the battery. On the other hand, when a fuel cell system is used as the power source of an electronic device, many of the fundamental physical, electrochemical and electrical characteristics of the fuel cell system are altered, either permanently or temporarily by the usage pattern of the electronic (load) device. This alteration of the fuel cell system characteristics has a direct impact on the performance and useful life of the fuel cell power source. The average dynamic and peak load patterns of the electronic device also affect the fuel consumption and conversion efficiency of the fuel cell system. The current generation of digital, multi-functional electronic devices has variable duty cycles consisting of sharp short-duration power spikes followed by longer periods of low power needs. Optimizing a fuel cell power source for this class of electronic devices is a complicated process involving keeping track of usage patterns of an individual user, the dynamic power requirements of the electronic device itself, and the operating characteristics of the fuel cell system.

Current technology addresses some aspects of this problem as it relates to automotive vehicles that use a hybrid power source consisting of a battery and a fuel cell system. For example, U.S. Pat. No. 6,321,145 issued Nov. 20, 2001 to Rajashekara, and titled "Method and apparatus for a fuel cell propulsion system" teaches a method for selectively using power either from the battery or from the fuel cell system depending on the current operational context of the vehicle. Similar methods and apparatus have also been described in U.S. Pat. No. 5,808,448 issued Sep. 15, 1998 to Naito, and titled "Method and apparatus for operating an electric vehicle having a hybrid battery".

Though the current technology methods address the problem of load sharing between a fuel cell and a battery as they relate to hybrid power sources, they do not address the core issue of optimizing the operational performance of a fuel cell power source based on the dynamic power requirements of the electronic device. In addition, these schemes also do not provide for performance effects of the usage profile of the load device on a fuel cell based power source.

Accordingly, what is needed is a method and apparatus that takes into consideration and balances the power characteristics of the fuel cell system, the dynamic load requirements of the electronic device and the usage profile of one or more device user's for use of fuel cell system as a power source for a wide range of load devices.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT(S)

Figure 1:
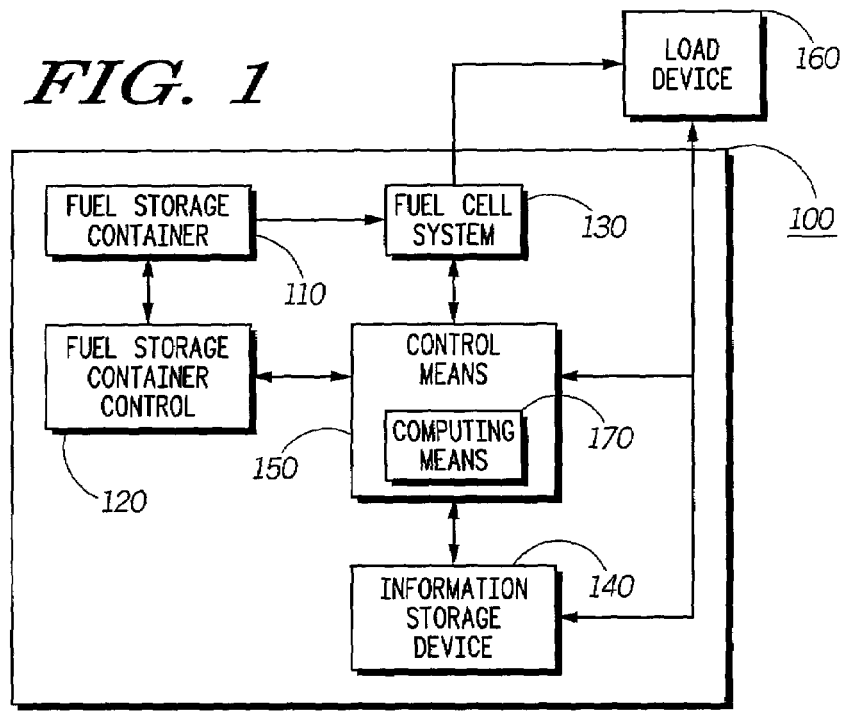
FIGS. 1–3 illustrate block diagrams of various embodiments of a fuel cell power source in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

An apparatus and method for efficiently operating a fuel cell power source for a load device is described herein. The method and apparatus balance three major elements that affect the operational behavior of a fuel cell power source. The dynamic load requirements of the load device and one or more device user's usage profile, which together are called power functional information sources, make up the first two elements, while the power characteristics of the fuel cell system makes up the third element. The method of efficiently operating the fuel cell power source involves capturing the usage profile of one or more device users of the load device over a period of time, converting each usage profile into actual power requirements of the load device based on the device's dynamic load characteristics, and selecting the operational parameters of the fuel cell system based on the computed load requirements of the load device.

The current-voltage (I-V) relationship of fuel cell power sources are significantly different from that of traditional chemical cell power sources such as lithium ion, lithium polymer, nickel metal hydride and nickel cadmium batteries. The power conversion and fuel utilization efficiency of a fuel cell is closely related to its operating point on the I-V curve. In fuel cell power sources, the energy storage and energy conversion aspects are decoupled. Optimal operation of a fuel cell power source depends not only on the theoretical conversion efficiency of the fuel cell but also on the external power load patterns. For fuel cell powered devices, seemingly small differences in usage profiles can have a significant impact on fuel usage and overall system conversion efficiency. To exemplify, let's consider two cellular telephone users, User A and User B. Both users typically use their telephone for eight hours each day. In those eight hours, each user's telephone transmits for two hours and stands-by for six hours. User A tends to have lengthy telephone conversations, followed by long rests. User B, on the other hand, makes several calls throughout the day, each lasting only a few minutes, with little rest between calls. The fuel cell system in User A's fuel cell power source will cycle between a cool standby state to a hot transmit state during long transmissions. The fuel cell system in User B's fuel cell power source will temperature-cycle more frequently, but over a smaller range, never reaching the high temperature levels experienced with User A. Fuel cell systems operated in this mode, where power is drawn more frequently with smaller temperature cycling, will be more efficient and provide more operational time for the load device for a given amount of fuel. Hence, User B will experience more talk-time per unit of fuel than User A. Accordingly, the fuel cell system operating parameters required for User A are significantly different from that required for User B to realize optimal performance of the fuel cell power source.

A fuel cell power source 100 for providing power to a load device 160 in accordance with a preferred embodiment of the present invention is shown in FIG. 1. The fuel cell power source 100 includes a fuel storage container 110, which serves as the fuel source, a fuel storage container controller 120 for controlling the fuel storage container 110, a fuel cell system 130, an information storage device 140, and a control means 150 that controls the operation of other components in the fuel cell power source 100. It will be appreciated by those of ordinary skill in the art that the fuel cell system 130 can include one or more individual fuel cells coupled together. The fuel cell system 130 can optionally include supporting peripheral elements such as electrical output conditioning circuits, cooling systems, fans, pumps, valves and regulators. The control means 150 typically includes a computing means 170 such as a microprocessor that can perform arithmetic and logic operations and that can also communicate with other electrical circuit elements. Preferably, the computing means 170 is similar to the MC68328 microcontroller manufactured by Motorola, Inc. of Schaumburg, Ill. It will be appreciated that other similar microprocessors can be utilized for the computing means 170, and that additional microprocessors of the same or alternative type can be added as required for handling the processing requirements of the computing means 170. The fuel cell system 130 is coupled to the fuel storage container 110, the control means 150 and a load device 160. The control means 150 is further coupled to the load device 160, the information storage device 140, and the fuel storage controller 120. The information storage device 140 is further coupled to the load device 160. It will be appreciated by those of ordinary skill in the art that the information storage device 140 can include a random access memory (RAM), a read-only memory (ROM), an electrically erasable programmable read-only memory (EEPROM), or an equivalent. It will further be appreciated by those of ordinary skill in the art that, alternatively, the information storage device 140 can be contained within the control means 150 in accordance with the present invention.

As illustrated in FIG. 1, the fuel cell power source 100 is coupled to the load device 160, which operates using the power from the fuel cell power source 100. It will be appreciated by one of ordinary skill in the art that the load device 160 in accordance with the present invention, can be a handheld computer, a laptop computer, a palmtop computer, a personal digital assistant, a power tool, a mobile cellular telephone, a mobile radio data terminal, a mobile cellular telephone having an attached data terminal, or a two way pager, such as the "Page Writer 2000X" manufactured by Motorola Inc. of Schaumburg, Ill. In the following description, the term "load device" refers to any of the devices mentioned above or any equivalent load device. Though many of the embodiments in the specification describe a cellular telephone as the load device, the invention is not limited to cellular telephones. Any device that can be powered by a fuel cell power source can be used without deviating from the scope and structure of the invention.

As the fuel cell power source 100 begins to operate, the control means 150 searches the information storage device 140 to verify the presence of data about the dynamic load patterns of the connected load device 160. The startup sequence also ensures that data about one or more device user's load device usage pattern and the power characteristics of the fuel cell system 130 are available in the information storage device 140. When data about the load pattern of the load device 160 is missing, the control means 150 queries the coupled load device 160 for that information and stores it in the information storage device 140 for future use. In one embodiment, the control means 150 further queries the load device 160 for identification of the current device user of the load device 160. When the device usage pattern of the current device user of the coupled load device 160 or the power characteristics of the fuel cell system 130 is missing, default values for the parameters associated with this data, stored in the information storage device 140, are used by the control means 150. In addition, the control means 150 starts recording the pattern of usage of the load device 160 by the current device user and also the power characteristics of the fuel cell system 130. Once sufficient information has been recorded, the values are stored in the information storage device 140 for future use. It will be appreciated by one of ordinary skill in the art that a plurality of device user usage patterns for a plurality of device users for one or more load devices can be stored in the information storage device 140 in accordance with the present invention.

The control means 150 computes the net power loading requirements of the load device 160 by combining and matching the dynamic load requirements of the load device 160 with the historic usage pattern of the specified device user. Once the net power requirements are known, the control means 150 sets the initial operating point for the fuel cell system 130 by matching net power requirements with the power characteristics of the fuel cell system 130. The control means 150 continues to adjust the operating point of the fuel cell system 130 as the load patterns and state of the fuel cell power source 100 vary over time.

As an example, when the load device 160 is a cellular telephone, the dynamic load requirements can include the peak transmit current, the duration and frequency of the transmit current, the standby current and the sleep mode current. Many of these parameters for cellular telephone applications are determined by the protocol used by the cellular telephone (i.e. Code Division Multiple Access (CDMA), Time Division Multiple Access (TDMA), and Global System for Mobile Communications (GSM)), the operating mode of the cellular telephone, the operating frequency band of the cellular telephone, the applications running on the cellular telephone and the country in which the cellular telephone operates. It will be appreciated by those of ordinary skill in the art that the dynamic load requirements can be any combination of requirements described herein or an equivalent in accordance with the present invention.

The device user usage pattern for a cellular telephone can include the number of calls made in a specified period of time, the frequency of calls made, the duration of each call and the types of services used (voice vs. data). Similarly, the usage pattern parameters for cellular telephones can further include time in standby mode, speaker volume, backlight usage, mode of operation (e.g. TDMA vs. GSM) and alert usage (vibrate vs. ringer). The usage pattern also takes into account special circumstances unique to multi-functional data-centric cellular telephones such as additional power usage from an always-on connection, streaming video and audio services, and video games. The present invention stores data corresponding to the usage pattern parameters for each device user of each load device in the information storage device 140. It will be appreciated by those of ordinary skill in the art that the usage pattern parameters can be any combination of parameters described herein or an equivalent in accordance with the present invention.

The power characteristics of the fuel cell system 130 can include the type of fuel and oxidant supply system, which determines the system response time and efficiency of the fuel cell, the type of fuel cell construction, the electrolyte, electrode, gas diffusion and catalyst materials used and how they are assembled and positioned together, age of the fuel cell, load capacity, I-V curve, and the operating pressure, temperature and humidity of the fuel cell system 130. It will be appreciated by those of ordinary skill in the art that the power characteristics of the fuel cell system 130 can be any combination of characteristics described herein or an equivalent in accordance with the present invention.

Setting the operating point of the fuel cell system 130 includes selecting the current-voltage output relation of the fuel cells contained within the fuel cell system 130, controlling the stoichiometry and rate of reactant flow, managing the hydration level of the electrolyte and the product water generation and the purging cycle to remove contaminants in the case of dead-ended fuel cells. When the control means 150 sets the operating point, it changes the operating voltage and current output of the fuel cells contained within the fuel cell system 130 so that the fuel cells operate at the most efficient part of the I-V curve. The concept of I-V curves as they relate to fuel cells and the various parameters of the fuel cell that impact the operating point on the I-V curve are well known in the fuel cell art. For example, U.S. Pat. Nos. 6,300,000, 5,290,641, and 5,023,150 describe the nature and characteristics of fuel cell I-V curves. The control means 150 can also vary the amount of fuel and oxidant reaching the fuel cell to control reaction rate and product water generation. In fuel cell systems with active elements such as fans, blowers, pumps, cooling systems and similar components, the control means 150 can vary the parameters of these components to match the power output of the fuel cells to the dynamic load characteristics of the load device 160 and the usage pattern of the device user.

Preferably, and in accordance with the present invention, additional functions can be implemented to enhance and validate the three dimensions used by the control means 150 to operate the fuel cell system 130. The control means 150 performs a series of test sequences on the fuel cells contained within the fuel cell system 130 at startup to ensure that the fuel cell system power characteristics stored in the information storage device 140 are valid and current. The test sequences can include tests for internal impedance of the fuel cells, the current and voltage output of the fuel cells under standard loading conditions, and the hydration level and age of the electrolyte membrane. If necessary, the control means 150 will update the parameters defining the power characteristics of the fuel cell system 130 stored in the information storage device 140.

In a second embodiment of the present invention, in addition to operating the fuel cell power source 100 in a fashion optimally matched with the output requirements, the control means 150 also estimates the amount of power capacity remaining in the fuel cell power source 100. Measurement of the remaining capacity depends not only on accurately measuring the amount of fuel remaining in the fuel storage container 110 but also on accurately predicting the external power load patterns and the operating point of the fuel cell at these load conditions. The current generation of digital, multi-functional portable communication devices has variable duty cycles consisting of sharp short-duration power spikes followed by longer periods of low power needs. For this class of load devices, computing the remaining energy capacity is a complicated process involving keeping track of usage patterns of each individual device user, the dynamic power requirements of the load device 160, the power characteristics of the fuel cell system 130 and measuring the amount of fuel remaining in the fuel storage container 110. Since the control means 150 of the fuel cell power source 100 already has access to this information, the second embodiment of the present invention leverages this feature to implement accurate fuel gauging function for the fuel cell power source 100. The remaining capacity is continually measured while the load device 160 is in operation so as to provide the device user current status of the fuel cell power source 100. In addition, the feedback provided to the device user is preferably in terms of the amount of time that the load device 160 is likely to operate with the available energy reserve in various operating modes of the load device 160.

Figure 2:
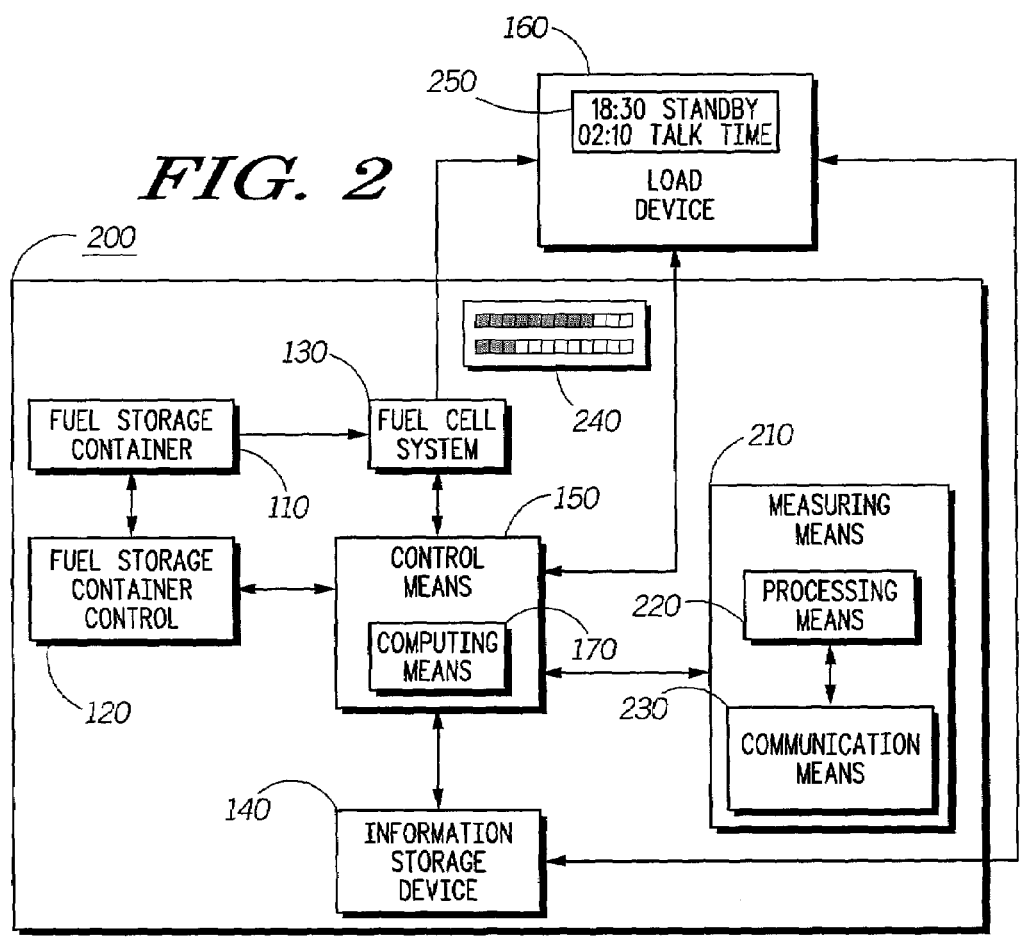

FIG. 2 illustrates an alternate embodiment of a fuel cell power source 200 for providing power to the load device 160 in accordance with the present invention. The fuel cell power source 200 includes the fuel storage container 110, which serves as the fuel source, the fuel storage container controller 120 coupled to the fuel storage container 110 for controlling the fuel storage container 110, the fuel cell system 130 coupled to the fuel storage container 110, the information storage device 140 coupled to the load device 160, and the control means 150, coupled to the fuel cell system 130 and the information storage device 140, that controls the operation of other components in the fuel cell power source 200. The control means 150 preferably and in accordance with the present invention further provides fuel gauging information to the load device 160. It will be appreciated by those of ordinary skill in the art that the fuel cell system 130 can include one of more individual fuel cells connected with each other. The fuel cell power source 200 as illustrated in FIG. 2 preferably further includes a measuring means 210 coupled to the control means 150. The measuring means 210 preferably is comprised of a processing means 220 such as a microprocessor circuit that is capable of computing the remaining capacity of the fuel cell power source 200 using the net power requirements of the load device 160 and the power characteristics of the fuel cell system 130. Preferably, the processing means 220 is similar to the MC68328 microcontroller manufactured by Motorola, Inc. of Schaumburg, Ill. It will be appreciated that other similar microprocessors can be utilized for the processing means 220, and that additional microprocessors of the same or alternative type can be added as required for handling the processing requirements of the processing means 220. In addition, a communication means 230 coupled to the processing means 220 is also included within the measuring means 210. The communication means can be implemented using additional electrical circuit elements that selectively transfer information from the microprocessor circuit in the processing means 220 to the load device 160 via the control means 150.

The fuel cell power source 200 is coupled to the load device 160 via the fuel cell system 130, the information storage device 140 and the control means 150. The load device 160 operates by using the power provided by the fuel cell power source 200. As the fuel cell power source 200 begins to operate, the control means 150 searches the information storage device 140 to verify the presence of data about the dynamic load patterns of the connected load device 160. The startup sequence also ensures that data about one or more device user's load device usage pattern and the power characteristics of the fuel cell system 130 are available in the information storage device 140. When data about load pattern of the load device 160 is missing, the control means 150 queries the attached load device 160 for that information and stores it in the information storage device 140 for future use. In one embodiment, the control means 150 further queries the load device 160 for identification of the current device user of the load device 160. When the device usage pattern of the current device user of the coupled load device 160 or the operating characteristics of the fuel cell system 130 is missing, default values for the parameters associated with this data, stored in the information storage device 140, are used by the control means 150. In addition, the control means 150 starts recording the pattern of load device usage by the current device user and the operating characteristics of the fuel cell system 130. Once sufficient information has been recorded, the values are stored in the information storage device 140 for future use. It will be appreciated by one of ordinary skill in the art that a plurality of device user usage patterns for a plurality of device users for one or more load devices can be stored in the information storage device 140 in accordance with the present invention.

The control means 150 computes the net power loading requirements of the load device 160 by combining and matching the dynamic load requirements of the load device 160 with the historic usage pattern of the current device user. Once the net power requirements are known then, the control means 150 sets the initial operating point for the fuel cell system 130. The control means 150 continues to adjust the operating point of the fuel cell system 130 as the load patterns and state of the fuel cell system 130 varies over time. In addition, as part of the startup sequence, the control means 150 also queries the fuel storage container controller 120 to obtain the value of remaining fuel in the fuel storage container 110. Using information about the power characteristics of the fuel cell system 130, the dynamic load requirements of the load device 160, the pattern of usage of the device user and the remaining quantity of fuel in the fuel storage container 110, the control means 150 computes fuel gauging information such as power capacity remaining in the fuel cell power source 200, the amount of time the load device 160 could be operated in different modes, the fuel consumption rate and the energy conversion efficiency. It will be appreciated by those of ordinary skill in the art that the fuel gauging information can include any combination of information described herein or an equivalent in accordance with the present invention.

The method of measuring the remaining capacity includes measuring the remaining energy capacity of the fuel cell system 130 based on the quantity of remaining fuel, referring to a lookup table or an equation representing the device usage profile for a particular device user of the load device 160 stored in the information storage device 140, and computing expected operational time of the load device 160 by estimating the conversion efficiency of the fuel cell system 130 corresponding to the usage profile. The changes in efficiency and I-V operating point for a given output load which are characteristic of a particular fuel cell system 130 are used to measure the remaining operational time of the load device 160. The remaining capacity parameters computed by the control means 150 can be displayed to the device user either through a device user interface element 250 in the load device 160 or a user interface element 240 in the fuel cell power source 200, or an equivalent.

For fuel cell powered devices, small differences in usage models can have a significant impact on fuel usage and overall fuel cell system conversion efficiency. For example, consider two cellular telephone users, User A and User B. Both users typically use their cellular telephone for eight hours each day. In those eight hours, each user's cellular telephone transmits for two hours and stands-by for six hours. User A tends to have lengthy telephone conversations, followed by long rests. User B, on the other hand, makes several calls throughout the day, each lasting only a few minutes, with little rest between calls. The fuel cell system in User A's fuel cell power source will cycle between a cool standby state to a hot transmit state during long transmissions. The fuel cell system in User B's fuel cell power source will temperature-cycle more frequently, but over a smaller range, never reaching the high temperature levels experienced by the fuel cell system in User A's fuel cell power source. Fuel cell systems operated in this mode, where power is drawn more frequently with smaller temperature cycling will be more efficient and provide more operational time for the load device for a given amount of fuel. Hence User B will experience more talk-time per unit of fuel than User A. Accordingly, the fuel gage used for estimating the remaining capacity of the fuel cell power source 200 for the load device 160 uses different usage models for Users A and B for improved prediction accuracy.

Preferably and in accordance with the present invention, additional functions can be implemented to enhance and validate the three dimensions used by the control means 150 to operate the fuel cell power source 200 and compute the fuel gauging information. The control means 150 performs a series of test sequences on the fuel cells at the startup to ensure that the fuel cell system power characteristics stored in the information storage device 140 are valid and current. The test sequences can include tests for internal impedance of the cells, the current and voltage output of the cells under standard loading conditions, and the hydration level and age of the electrolyte membrane. It will be appreciated by those of ordinary skill in the art that the tests can include any combination of those described herein or an equivalent in accordance with the present invention. If necessary, the control means 150 will update the parameters defining the fuel cell power characteristics stored in the information storage device 140.

Figure 3:
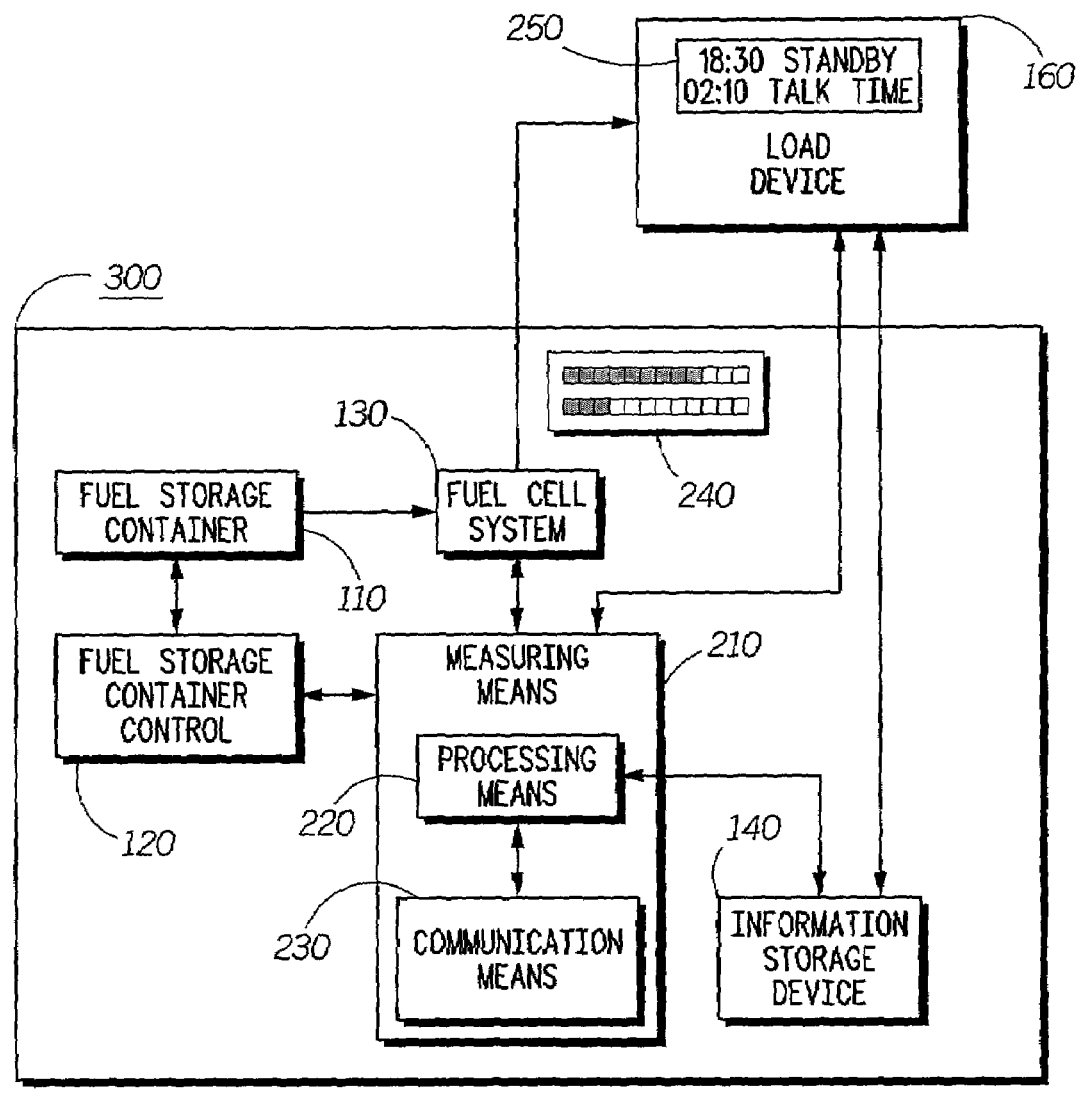

In a third embodiment of the present invention, the measuring means estimates the amount of power capacity remaining in the fuel cell power source. FIG. 3 illustrates this third embodiment of a fuel cell power source 300 for providing power to the load device 160 in accordance with the present invention. The fuel cell power source 300 includes the fuel storage container 110, which serves as the fuel source, the fuel storage container controller 120 coupled to the fuel storage container 110 for controlling the fuel storage container 110, the fuel cell system 130 coupled to the fuel storage container 110, the information storage device 140 coupled to the load device 160, and the measuring means 210 that provides fuel gauging information to the load device 160. The measuring means 210, coupled to the information storage device 140, the fuel cell system 130, and to the fuel storage container controller 120, preferably includes the processing means 220 such as a microprocessor circuit that is capable of computing the remaining capacity of the fuel cell power source using the net power requirements of the load device 160 and the power characteristics of the fuel cell system 130.

The fuel cell power source 300 is coupled to the load device 160, which operates using the power provided by the fuel cell power source 300. As the fuel cell power source 300 begins to operate, the measuring means 210 searches the information storage device 140 to verify the presence of data about the dynamic load patterns of the connected load device 160. The startup sequence also ensures that data about one or more device user's load device usage pattern and the power characteristics of the fuel cell system 130 are available in the information storage device 140. When data about the load pattern of the load device 160 is missing, the measuring means 210 queries the attached load device 160 for that information and stores it in the information storage device 140 for future use. In one embodiment, the measuring means 210 further queries the load device 160 for identification of the current device user of the load device 160. If the device user usage pattern or the power characteristics of the fuel cell system 130 is missing, default values for the parameters associated with this data, stored in the information storage device 140 are used by the measuring means 210. In addition, the measuring means 210 starts recording the pattern of load device usage by the current device user and the power characteristics of the fuel cell system 130. Once sufficient information has been recorded, the values are stored in the information storage device 140 for future use. It will be appreciated by one of ordinary skill in the art that a plurality of device user usage patterns for a plurality of device users for one or more load devices can be stored in the information storage device 140 in accordance with the present invention.

The measuring means 210 computes the net power loading requirements of the load device 160 by combining and matching the dynamic load requirements of the load device 160 with the historic usage pattern of each device user. In addition, as part of the startup sequence, the measuring means 210 also queries the fuel storage container controller 120 to obtain the value of remaining fuel in the fuel storage container 110. Using information about the power characteristics of the fuel cell system 130, the dynamic load requirements of the load device 160, the pattern of usage of the device user, and the remaining quantity of fuel in the fuel storage container 110, the measuring means 210 computes fuel gauging information such as power capacity remaining in the fuel cell power source 300, the amount of time the load device 160 could be operated in different modes, the fuel consumption rate and the energy conversion efficiency. It will be appreciated by those of ordinary skill in the art that the fuel gauging information can include any combination of information described herein or an equivalent in accordance with the present invention. The remaining capacity parameters computed by the measuring means 210 can be displayed to the device user either through the device user interface element 250 in the load device 160 or the user interface element 240 in the fuel cell power source 300, or an equivalent.

Figure 4:
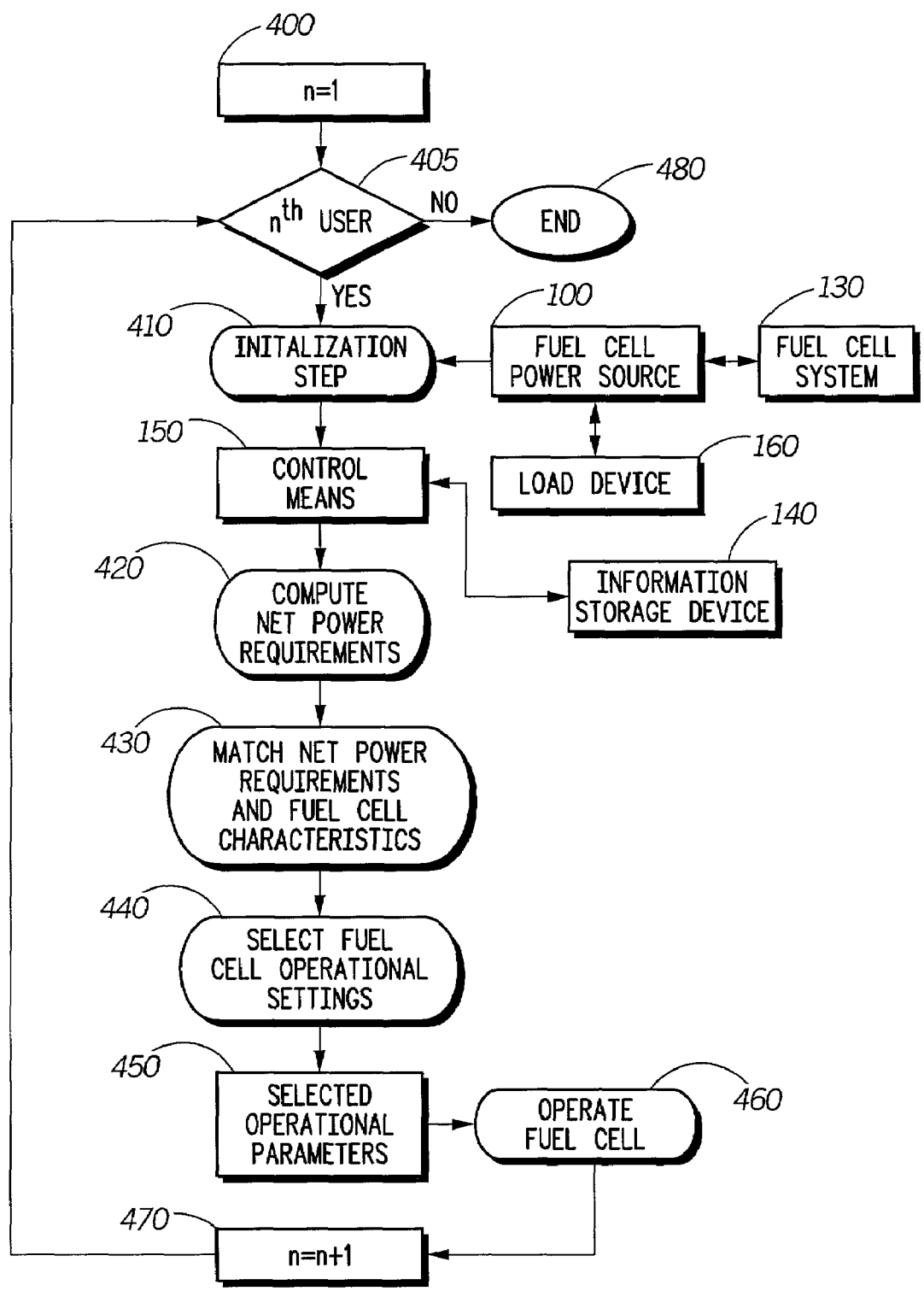
FIG. 4 illustrates a process flow diagram of the operation of a fuel cell power source in accordance with a preferred embodiment of the present invention.

FIG. 4 illustrates a flow chart of the process used to manage the performance of a fuel cell power source in accordance with the present invention. In FIG. 4, rectangular boxes represent structural entities in the process, and boxes with rounded corners represent process steps to achieve the various structural entities. Referring to FIG. 4, the process flow starts at step 400 where a counter "n" is set to 1. Next, the process goes to a decision point 405 which confirms the operation of the load device 160 by the $n^{th}$ device user. If the decision point returns a "yes", the process flow continues with an initialization step 410 during which the control means 150 in the fuel cell power source (100, 200) queries the information storage device 140 to verify the presence of data about the dynamic load patterns of the connected load device 160. The initialization step also ensures that data about the load device usage pattern of the $n^{th}$ user and the power characteristics of the fuel cell system 130 are available. When data about the load pattern of the load device 160 is missing, the control means 150 queries the attached load device 160 for that information and stores it in the information storage device 140 for future use. When the $n^{th}$ user's usage pattern or the power characteristics of the fuel cell system 130 is missing, default values for the parameters associated with this data, stored in the information storage device 140 are used by the control means 150. The parameters associated with the dynamic load requirements of the load device 160 are matched with the usage pattern of the $n^{th}$ device user to compute 420 the net power loading requirements of the load device 160. In the next step 430, the control means 150 matches the net power requirements to the power characteristics of the fuel cell system 130 stored in the information storage device 140 to select, in step 440, settings for the operation of the fuel cell power source 100. The control means 150 uses the selected parameters in step 450 to operate 460 the fuel cell system 130 at the target condition. Next, in step 470, the counter "n" is incremented. The process then feeds back to the decision point 405 which continues to check for a user condition until the decision point 405 returns a "no", in which case, the process flow terminates at end point 480.

It will be appreciated by those of ordinary skill in the art that application of the method as illustrated in FIG. 4 for operating a fuel cell power source is not limited to any particular type of load device. Some applications of this method to electronic devices were described herein. Examples of non-electronic device applications include fuel cell powered or hybrid electric automobiles. Each driver of the automobile has a different driving style, and hence a different impact on fuel efficiency. Useful parameters that constitute the usage profile for this application include acceleration from stop, average speed, stopping frequency, acceleration variability, cruise control usage, and many others. The present invention is an improvement on modern day cars, whether gas powered, hybrid, electric or fuel cell powered, in that it allows for custom tailored performance and fuel efficiency for each driver.

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. A method for operating a fuel cell power source, comprising the steps of:
   coupling a load device to the fuel cell power source;
   continuously capturing a user profile for each of a plurality of device users of the load device over a period of time;
   obtaining one or more dynamic load characteristics of the load device; computing an associated power requirement of the load device for each of the plurality of device users using each of the usage profiles and the dynamic load characteristics;
   identifying a device user;
   selecting one or more operational parameters of the fuel cell system using the computed load requirements for the identified device user; and
   operating the fuel cell power source in response to the one or more operational parameters.

2. A method for operating a fuel cell power source as recited in claim 1, further comprising, prior to the computing step, the steps of:
   storing the one or more dynamic load characteristics of the load device in an information storage device; and
   retrieving the stored one or more dynamic load characteristics from the information storage device.

3. A method for operating a fuel cell power source as recited in claim 2, further comprising, prior to the computing step, the steps of:
   storing the usage profile for each of the device users of a load device over a period of time in the information storage device; and
   retrieving the usage profile for the stored usage profiles from the information storage device.

4. A method for operating a fuel cell power source as recited in claim 1, further comprising the steps of:
   periodically computing the associated power requirements for the load device for each of the plurality of device users using each of the usage profiles and the dynamic load characteristics; and
   selecting one or more operational parameters of the fuel cell system using the re-computed load requirements for the identified device user.

5. A method of operating a fuel cell power source as recited in claim 4 further comprising, prior to the re-computing step, the steps of:
   continuously capturing the usage profile for the identified user;
   continuously storing the usage profile for the identified user in the information storage device; and
   retrieving the usage profile from the information storage device.

6. A method for operating a fuel cell power source as recited in claim 1, further comprising the steps of:
   identify a second device user; and
   selecting one or more operational parameters of the fuel cell system using the computed load requirements for the identified device user.

7. A method for operating a fuel cell power source as recited in claim 1, wherein the selecting one or more operational parameters of the fuel cell system step comprises:
   selecting one or more operational parameters of the fuel cell system from the group comprising a current-voltage relationship of the fuel cell system, a fuel consumption rate, a fuel and air stoichiometry, an electrolyte hydration level, a product water generation rate and a power conversion rate.

8. A method for operating a fuel cell power source as recited in claim 1, wherein the load device in the coupling step is selected from the group of load devices comprising a cellular telephone, a portable computer, a personal digital assistant, an entertainment system and a power tool.

9. A method for operating a fuel cell power source as recited in claim 1, further comprising the steps of:
   obtaining one or more power characteristics of the fuel cell power source; and
   calculating the remaining capacity of the fuel cell power source using the computed associated power requirement of the load device and the power characteristics of the fuel cell power source.

10. A method for operating a fuel cell power source as recited in claim 9, wherein the calculating step comprises:
    measuring a remaining fuel information; and
    combining the remaining fuel information with the power requirements of the load device and the power characteristics of the fuel cell system to estimate the remaining capacity of the fuel cell power source.

11. A method for operating a fuel cell power source as recited in claim 10, further comprising the step of:
    displaying the remaining capacity of the fuel cell power source on a display.

12. A method for operating a fuel cell power source as recited in claim 10, further comprising the step of:
    communicating the remaining capacity of the fuel cell power source to the load device.

* * * * *